United States Patent
Okamura et al.

(10) Patent No.: US 7,910,672 B2
(45) Date of Patent: Mar. 22, 2011

(54) POWDER OF A VINYLPYRROLIDONE POLYMER AND A PROCESS FOR PRODUCTION THEREOF

(75) Inventors: Kazuhiro Okamura, Sanda (JP); Norihiro Wakao, Yokohama (JP); Keiji Watanabe, Jyoetsu (JP); Keiichi Fujise, Kusatsu (JP)

(73) Assignees: Nippon Shokubai Co., Ltd., Osaka (JP); Dai-Ichi Kogyo Sei Yaku Co., Ltd., Kyoto (JP)

( * ) Notice: Subject to any disclaimer, the term of this patent is extended or adjusted under 35 U.S.C. 154(b) by 864 days.

(21) Appl. No.: 11/666,883

(22) PCT Filed: Nov. 2, 2005

(86) PCT No.: PCT/JP2005/020220
§ 371 (c)(1),
(2), (4) Date: May 2, 2007

(87) PCT Pub. No.: WO2006/049214
PCT Pub. Date: May 11, 2006

(65) Prior Publication Data
US 2008/0153988 A1 Jun. 26, 2008

(30) Foreign Application Priority Data
Nov. 5, 2004 (JP) .................. 2004-322770

(51) Int. Cl.
*C08F 26/10* (2006.01)
(52) U.S. Cl. ........................................ 526/264
(58) Field of Classification Search .............. 526/264
See application file for complete search history.

(56) References Cited

U.S. PATENT DOCUMENTS

| 4,125,602 A * | 11/1978 | Atasoy et al. ................ 525/358 |
| 4,786,699 A | 11/1988 | Nuber et al. |
| 5,158,768 A * | 10/1992 | Merianos et al. .......... 424/78.36 |
| 6,829,843 B2 * | 12/2004 | Fujise .............................. 34/282 |
| 2001/0025093 A1 | 9/2001 | Ishizaki et al. |

FOREIGN PATENT DOCUMENTS

| EP | 1 130 045 | 9/2001 |
| JP | 62-62804 | 3/1987 |
| JP | 11-349687 | 12/1999 |
| JP | 2002-146033 | 5/2002 |

* cited by examiner

*Primary Examiner* — Bernard Lipman
(74) *Attorney, Agent, or Firm* — Wenderoth, Lind & Ponack, LLP.

(57) ABSTRACT

The present invention is a powder of a vinylpyrrolidone polymer having a K value of smaller than 50, characterized in that a content of particles having a particle diameter of 106 μm or smaller is 10% by mass or less and a content of particles having a particle diameter of greater than 1,000 μm is 5% by mass or lower. A process for production of a powder of a vinylpyrrolidone polymer according to the present invention is characterized in that a vinylpyrrolidone polymer having a K value of smaller than 50 is formed into a solution having a concentration from 30% to 70% by mass, and the solution is dried by using a hot surface adhesion-type dryer, followed by pulverization so that a content of particles having a particle diameter of 106 μm or smaller is 10% by mass or lower and a content of particles having a particle diameter of greater than 1,000 μm is 5% by mass or lower.

Thus, there is provided a powder of a vinylpyrrolidone polymer, which has excellent solubility in spite of having a low K value determined by a Fikentscher method and can be made into solution with favorable handleability without dust rising, and a process for production of the same.

2 Claims, No Drawings

POWDER OF A VINYLPYRROLIDONE POLYMER AND A PROCESS FOR PRODUCTION THEREOF

TECHNICAL FIELD

The present invention relates to a powder of a vinylpyrrolidone polymer having a low K value determined by a Fikentscher's method, which is used as solution by dissolving in solvent, and to a process for production of the same.

BACKGROUND ART

Conventionally, vinylpyrrolidone polymers such as polyvinylpyrrolidone and vinylpyrrolidone copolymer have widely been used in various uses such as medicines, cosmetics, pressure-sensitive or bonding adhesives, coatings, dispersants, inks and electronic parts by reason of having merits and advantages such as biocompatibility, safety and hydrophilic property. On that occasion, the molecular weight of vinylpyrrolidone polymers to be used has an optimum range in accordance with each of the uses; for example, the polymers having low molecular weight, namely, the polymers which are low in K value determined by a Fikentscher's method (occasionally referred to as simply "a K value" hereinafter) are suitable in uses such as pressure-sensitive or bonding adhesives for glue stick, cosmetic materials such as humectants and hair conditioners, and tablet binders.

Incidentally, in the case of using vinylpyrrolidone polymers for various uses, in order that solvent used in polymerization for obtaining the polymers may not remain in the polymers, or in consideration of convenience during transportation and storage, the polymers are once formed into a powdery state, thereafter dissolved in desirable solvent and used as solution in many cases.

The followings are generally adopted for industrially obtaining a powder of a vinylpyrrolidone polymer:

i) a process of drying a solution containing a vinylpyrrolidone polymer (typically, a polymerization solution obtained in polymerization for synthesizing a vinylpyrrolidone polymer) by a spray-type dryer such as a spray dryer to obtain a powder, and ii) a process of drying a solution containing a vinylpyrrolidone polymer (typically, a polymerization solution obtained in polymerization for synthesizing a vinylpyrrolidone polymer) by hot surface adhesion-type dryers such as a disk rotary dryer, a drum rotary dryer and a belt dryer to form a dry matter in sheet shape or thin chip shape and thereafter pulverize the dry matter; and the K value of a vinylpyrrolidone polymer has determined either i) or ii) to be adopted so far.

Specifically, above-mentioned process i) has generally been adopted in the case of a low K value, while the above-mentioned process ii) has generally been adopted in the case of a high K value (refer to Japanese Unexamined Patent Publication Nos. 2002-146033 and 62-62804). The reason therefor is that industrially, typically, a polymerization solution obtained in polymerization for synthesizing a vinylpyrrolidone polymer is directly used as a solution containing a vinylpyrrolidone polymer and dried; then, in the case of a vinylpyrrolidone polymer having a low K value, namely, a low molecular weight, for the reason that the viscosity of the solution to be dried is low, hot surface adhesion-type dryers such as a disk rotary dryer, a drum rotary dryer and a belt dryer do not successfully allow the dried polymer to be formed into a dry matter in sheet shape or thin chip shape and thereby are difficult to apply, while in the case of a vinylpyrrolidone polymer having a high K value, namely, a high molecular weight, for the reason that the viscosity of the solution to be dried is high, a spray-type dryer such as a spray dryer does not successfully allow the solution to be sprayed and thereby are difficult to apply. An example such that solution of a vinylpyrrolidone polymer having a low K value, for example, smaller than 50 is dried by hot surface adhesion-type dryers such as a disk rotary dryer, a drum rotary dryer and a belt dryer has not been reported.

However, a powder obtained by the above-mentioned process i) of drying by a spray-type dryer to be pulverized has problems that dust rises easily and that handleability is poor when the powder is dissolved for use in a desirable solvent into solution since most of the powder inevitably becomes fine particles having a small particle diameter. In addition, it is generally conceived that the smaller the particle diameter is, the more easily a powder is dissolved; contrary to this common assumption, a powder obtained by the above-mentioned process i) of drying by a spray-type dryer to be pulverized is very poor in solubility and has problems such that very intricate handling and long-time dissolution handling become necessary when dissolved for use in desirable solvent into solution. As described above, a powder of a vinylpyrrolidone polymer having a low K value has conventionally been obtained by drying by a spray-type dryer of the above-mentioned i), and a powder of a vinylpyrrolidone polymer having a low K value, which can solve the problems of handleability and solubility when dissolved in the above-mentioned solvent, has not been known.

Then, the problems to be solved by the present invention are to provide a powder of a vinylpyrrolidone polymer, which has excellent solubility in spite of having a low K value determined by a Fikentscher's method and can be made into solution with favorable handleability without dust rising, and to provide a process for production of the same.

DISCLOSURE OF THE INVENTION

The inventors of the present invention have made earnest studies for solving the above-mentioned problems. As a result, with regard to solubility, in addition to the conventional findings that dissolution becomes difficult when a content of particles having a large particle diameter is high, the inventors of the present invention have found out contrary to common assumption which has generally been conceived, new findings that dissolution becomes difficult also when the content of particles having a too small particle diameter is high. They have also found out that by determining the ratio of particles having a specific particle diameter or less at a certain value or less, the problems that dust rises easily and that handleability are poor can be solved. Then, on the basis of these findings, they have found out that a powder in which the content of each of particles of 106 μm or smaller and particles of greater than 1,000 μm is specific amount or less can solve the above-mentioned problems all together. They have also found out that it is important for obtaining such a powder that a process of drying vinylpyrrolidone polymer solution by using a hot surface adhesion-type dryer and thereafter pulverizing it is applied to even a vinylpyrrolidone polymer having a K value as low as smaller than 50, and the preparation of the concentration of the solution to be dried for specific range allows this application. The present invention has been completed by these findings.

That is to say, a powder of a vinylpyrrolidone polymer according to the present invention is a powder of a vinylpyrrolidone polymer having a K value of smaller than 50 as determined by a Fikentscher's method, characterized in that a content of particles having a particle diameter of 106 μm or smaller is 10% by mass or lower, and a content of particles having a particle diameter of greater than 1,000 μm is 5% by mass or lower.

A process for production of a powder of a vinylpyrrolidone polymer according to the present invention is such that a vinylpyrrolidone polymer having a K value of smaller than 50 as determined by a Fikentscher's method is formed into a solution having a concentration from 30% to 70% by mass, and the solution is dried by using a hot surface adhesion-type dryer, followed by pulverization so that a content of particles having a particle diameter of 106 μm or smaller is 10% by mass or lower and a content of particles having a particle diameter of greater than 1,000 μm is 5% by mass or lower.

BEST MODE FOR CARRYING OUT THE INVENTION

A powder of a vinylpyrrolidone polymer and a process for production of the same according to the present invention are described in detail hereinafter, and the scope of the present invention is not restricted to these descriptions and can properly be modified and performed in a range of not deteriorating the spirit of the present invention other than the following exemplification, too.

[A Powder of a Vinylpyrrolidone Polymer]

A powder of a vinylpyrrolidone polymer according to the present invention is a powder of a vinylpyrrolidone polymer having a K value of smaller than 50 as determined by a Fikentscher's method.

In the present invention, a vinylpyrrolidone polymer is a compound having a structural unit represented by the following general formula (1) and specifically signifies polyvinylpyrrolidone and/or vinylpyrrolidone copolymer.

Polyvinylpyrrolidone is obtained by polymerizing vinylpyrrolidone by an optional method as described later, and vinylpyrrolidone copolymer is obtained by polymerizing vinylpyrrolidone and copolymerizable monomer therewith by an optional method as described later. In the present invention, a vinylpyrrolidone polymer may be of only one kind or two kinds or more.

[formula 1]

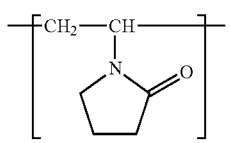

(1)

Examples of the above-mentioned copolymerizable monomer with vinylpyrrolidone are not particularly limited, but specifically include:

1) (meth)acrylates such as methyl (meth)acrylate, ethyl (meth)acrylate, butyl (meth)acrylate, cyclohexyl (meth)acrylate and hydroxyethyl (meth)acrylate;

2) (meth)acrylamide and (meth)acrylamide derivatives such as N-monomethyl (meth)acrylamide, N-monoethyl (meth)acrylamide and N,N-dimethyl (meth)acrylamide;

3) basic unsaturated monomers such as dimethylaminoethyl (meth)acrylate, dimethylaminoethyl (meth)acrylamide, vinylpyridine and vinylimidazole;

4) vinylamides such as vinylformamide, vinylacetamide and vinyloxazolidone;

5) carboxyl group-containing unsaturated monomers such as (meth)acrylic acid, itaconic acid, maleic acid and fumaric acid;

6) unsaturated acid anhydrides such as maleic anhydride and itaconic anhydride;

7) vinyl esters such as vinyl acetate and vinyl propionate;

8) vinylethylene carbonate and derivatives thereof;

9) styrene and derivatives thereof;

10) 2-ethyl sulfonate (meth)acrylate and derivatives thereof;

11) vinyl sulfonic acid and derivatives thereof;

12) vinyl ethers such as methyl vinyl ether, ethyl vinyl ether and butyl vinyl ether; and 13) olefins such as ethylene, propylene, octene and butadiene.

Among these monomers, 1) to 8) are particularly preferable in view of copolymerizability with vinylpyrrolidone. The above-mentioned copolymerizable monomer with vinylpyrrolidone may be of only one kind or two kinds or more.

On the occasion of obtaining the above-mentioned vinylpyrrolidone copolymer, the proportion of vinylpyrrolidone occupied in the total monomer components is not particularly limited, yet preferably 5% by mol or more, more preferably 20% by mol or more, most preferably 50% by mol or more with respect to the total monomer components. When the proportion of vinylpyrrolidone occupied in the total monomer components is less than 5% by mol, there is a possibility of being incapable of sufficiently showing various properties deriving from vinylpyrrolidone.

Polymerization reaction for obtaining a vinylpyrrolidone polymer can be performed by conventionally known polymerization methods such as bulk polymerization, solution polymerization, emulsion polymerization, suspension polymerization and precipitation polymerization.

Examples of a polymerization initiator capable of being used in polymerization reaction for obtaining a vinylpyrrolidone polymer are not particularly limited, but include conventionally known polymerization initiators: radical polymerization initiators, for example, azo compounds such as 2,2'-azobisisobutyronitrile and 2,2'-azobis-(2-methylpropionamidine)-dihydrochloride, and peroxides such as benzoyl peroxide and hydrogen peroxide; and cationic polymerization initiators such as boron trifluoride or complexes thereof, ferrous chloride, diethylaluminum chloride, diethylzinc, heteropoly acid and activated clay. These polymerization initiators may be of only one kind or two kinds or more. The used amount of the polymerization initiators in polymerization reaction is not particularly limited, yet preferably 0.001% to 10% by mass, more preferably 0.01% to 5% by mass, most preferably 0.05% to 3% by mass with respect to the monomer components. Optional chain transfer agents, co-catalysts, pH regulators and buffering agents can also be used properly as required for performing polymerization reaction in addition to the polymerization initiators.

Examples of solvent capable of being used in polymerization reaction for obtaining a vinylpyrrolidone polymer are not particularly limited, but include water; alcohols such as methyl alcohol, ethyl alcohol, isopropyl alcohol and diethylene glycol; ethers (acetates) of alkylene glycol such as propylene glycol monomethyl acetate and diethylene glycol monomethyl ether acetate; amides such as dimethylformamide and N-methylpyrrolidone; esters such as ethyl acetate, butyl acetate and γ-butyrolactone; aliphatic hydrocarbons such as hexane and octane; alicyclic saturated hydrocarbons such as cyclohexane; alicyclic unsaturated hydrocarbons such as cyclohexene; aromatic hydrocarbons such as benzene, toluene and xylene; ketones such as acetone and methyl ethyl ketone; halogenated hydrocarbons such as dichloroethane, chloroform and carbon tetrachloride; ethers such as diethyl ether, dioxane and tetrahydrofuran; sulfonates such as dimethyl sulfoxide; carbonate esters such as dimethyl carbonate and diethyl carbonate; and alicyclic carbonate esters such as ethylene carbonate and propylene carbonate. Among these, particularly, ethers (acetates) and amides are preferable, and water and alcohols are more preferable. These solvents may be of only one kind or two kinds or more. The used amount of the solvents in polymerization reaction is not particularly limited but properly determined; it is preferable in view of production efficiency that the concentration of a vinylpyrrolidone polymer occupied in polymerization solution obtained in polymerization reaction is determined in the concentration range of the after-mentioned vinylpyrrolidone polymer-containing solution, so that the polymerization solution can directly be used as the vinylpyrrolidone polymer-containing solution.

With regard to a vinylpyrrolidone polymer in the present invention, a K value determined by a Fikentscher's method is smaller than 50. The K value of the above-mentioned vinylpyrrolidone polymer may be properly determined in a range of smaller than 50 in accordance with uses, and the K value is preferably 45 or smaller, and more preferably 40 or smaller in view of the shortness of dissolution time in making a powder of a vinylpyrrolidone polymer according to the present invention into solution. In the present invention, the K value is a value denoted by the Fikentscher's expression in such a manner that the vinylpyrrolidone polymer is dissolved in an optional solvent capable of dissolving the vinylpyrrolidone polymer at a concentration of 10% by mass or lower to measure viscosity of the solution at a temperature of 25° C. by a capillary viscometer and use these measured values. The Fikentscher's expression is as follows.

$$(\log \eta_{rel})/C = [(75 \times K_0^2)/(1+1.5 \times K_0 \times C)] + K_0$$

$$K = 1000 \times K_0$$

In the expression, C denotes mass (number of grams) of the vinylpyrrolidone polymer in 100-mL solution and $\eta_{rel}$ denotes viscosity of the solution against the solvent.

With regard to a powder of a vinylpyrrolidone polymer according to the present invention, it is important that a content of particles of 106 μm or smaller (the particles having a particle diameter of 106 μm or smaller) is 10% by mass or lower and a content of particles of greater than 1,000 μm (the particles having a particle diameter of greater than 1,000 μm) is 5% by mass or lower. Thus, the powder of a vinylpyrrolidone polymer according to the present invention has excellent solubility and can be made into solution with favorable handleability without dust rising. When the content of particles having a particle diameter of 106 μm or smaller exceeds 10% by mass, solubility is markedly decreased and easy rising of dust deteriorates handleability. On the other hand, when the content of particles having a particle diameter of greater than 1,000 μm exceeds 5% by mass, solubility is decreased. The content of particles having a particle diameter of 106 μm or smaller is preferably 8% by mass or lower, more preferably 5% by mass or lower. On the other hand, the content of particles having a particle diameter of greater than 1,000 μm is preferably 3% by mass or lower, more preferably 1% by mass or lower, far more preferably 0.5% by mass or lower and particularly preferably 0.3% by mass or lower.

In the present invention, it is preferred that particle diameter is measured through sieve classification by using a sieve (JIS aperture of 106 μm or 1,000 μm) prescribed in Z8801-1 of the Japanese Industrial Standards. A content of particles having a particle diameter of 106 μm or smaller can be determined from the following expression (1) and a content of particles having a particle diameter of greater than 1,000 μm can be determined from the following expression (2).

A content of particles having a particle diameter of 106 μm or smaller (% by mass)=(mass of powder passing through a sieve with *JIS* aperture of 106 μm/mass of powder subject to sieve classification)×100     (1)

A content of particles having a particle diameter of greater than 1,000 μm (% by mass)=(mass of powder remaining on a sieve with *JIS* aperture of 1,000 μm/mass of powder subject to sieve classification)×100     (2)

A powder of a vinylpyrrolidone polymer according to the present invention can easily be obtained, for example, by the after-mentioned process for production of a powder of a vinylpyrrolidone polymer according to the present invention.

A powder of a vinylpyrrolidone polymer according to the present invention may properly contain the after-mentioned antioxidant and various addition agents in a range of not deteriorating the effect and object of the present invention.

A powder of a vinylpyrrolidone polymer according to the present invention is excellent in solubility, and dissolution time in dissolving 1 g of the powder in 100 g of water under stirring at 500 rpm is 250 seconds or less in a preferable embodiment thereof. The specific measurement of the dissolution time can be performed by a method described later in examples.

[Process for Production of a Powder of a Vinylpyrrolidone Polymer]

In a process for production of a powder of a vinylpyrrolidone polymer according to the present invention, a vinylpyrrolidone polymer having a K value of smaller than 50 as determined by a Fikentscher's method is first made into solution having a concentration of 30% to 70% by mass (hereinafter, solution of vinylpyrrolidone polymer having a concentration of 30% to 70% by mass and a K value of smaller than 50 is occasionally referred to also as "vinylpyrrolidone polymer-containing solution"). Thus, the polymer is made into solution having a concentration of 30% to 70% by mass, so that even vinylpyrrolidone polymer having a K value of smaller than 50 can be dried by using a hot surface adhesion-type dryer into a dry matter in sheet shape or thin chip shape. The polymer is made into solution having a concentration of preferably 30% to 60% by mass, more preferably 30% to 55% by mass. A vinylpyrrolidone polymer having a K value of smaller than 50 as determined by a Fikentscher's method is as described above in the section of [A Powder of a Vinylpyrrolidone Polymer].

The above-mentioned vinylpyrrolidone polymer-containing solution may be directly the above-mentioned polymerization solution after polymerization in polymerization reaction for obtaining a vinylpyrrolidone polymer if concentration thereof is in the above-mentioned range, or a solution obtained by dissolving a dry matter of a vinylpyrrolidone polymer in a proper solvent. In the latter case, examples of a solvent capable of being used include the same as is described above as solvent capable of being used in polymerization reaction for obtaining a vinylpyrrolidone polymer. In the above-mentioned vinylpyrrolidone polymer-containing solution, a dry matter does not need to be dissolved up to the whole amount but may not be dissolved partially.

The above-mentioned vinylpyrrolidone polymer-containing solution is preferably blended with at least one kind of antioxidant. Thus, change in a K value and coloring causable due to the following drying are restrained, and storage stability of a vinylpyrrolidone polymer can be improved. Examples of an antioxidant capable of being used include phenolic antioxidants such as sodium salicylate and methylbenzotriazole-potassium-salt; bisphenolic antioxidants such as 2,2'-methylenebis-(4-methyl-6-tert-butylphenol); polymeric phenolic antioxidants such as 1,1,3-tris(2-methyl-4-hydroxy-5-tert-butylphenyl)-butane; sulfuric antioxidants such as dilauryl-3,3'-thiodipropionate; phosphoric antioxidants such as triphenyl-phosphite; alcoholic antioxidants such as erythorbic acid; amine antioxidants such as methylated-diphenylamine; and hindered amine antioxidants such as 4-benzoyloxy-2,2,6,6-tetramethylpiperidine. These antioxidants may be of only one kind or two kinds or more. The used amount of the antioxidants is not particularly limited, yet preferably 0.00001% to 30% by mass, more preferably 0.01% to 3% by mass with respect to a vinylpyrrolidone polymer.

In addition, the above-mentioned vinylpyrrolidone polymer-containing solution can properly contain various addition agents such as processing stabilizing agents, plasticizers, dispersants, fillers, age resistors, pigments and curing agents as required in a range of not deteriorating the object and effect of the present invention.

In a process for production of a powder of a vinylpyrrolidone polymer according to the present invention, it is preferred that the above-mentioned vinylpyrrolidone polymer-containing solution is dried by using a hot surface adhesion-type dryer and thereafter (a) pulverized so that a content of particles of 106 µm or smaller (particles having a particle diameter of 106 µm or smaller) is 10% by mass or lower and a content of particles of greater than 1,000 µm (particles having a particle diameter of greater than 1,000 µm) is 5% by mass or lower, or (b) pulverized and subsequently classified so that a content of particles having a particle diameter of 106 µm or smaller is 10% by mass or lower and a content of particles having a particle diameter of greater than 1,000 µm is 5% by mass or lower. The process for production is described hereinafter.

In the present invention, the above-mentioned hot surface adhesion-type dryer is a device for heating and drying materials by heat conduction from a surface heated by a heating medium, namely, a heat transfer surface, which dryer allows a dry matter in sheet shape by applying the above-mentioned vinylpyrrolidone polymer-containing solution onto the heat transfer surface. The above-mentioned heat transfer surface adhesion-type dryer comprises a formulated solution feeder contained and additionally may include a dry matter stripping device/apparatus, a primary crusher and a conveyor.

The above-mentioned heat transfer surface is preferred to be such that a heating medium exists thereinside and becomes a heat source of materials, and may be of a movable type or a fixed type. The shape of the heat transfer surface is not particularly limited but may be planar, curved such as convex and concave, and shapes other than these. Materials for the heat transfer surface are not particularly limited; examples of the materials to be applied include stainless steel, iron, titanium, Teflon (registered trademark) and rubber, and the heat transfer surface made of metal such as stainless steel is preferable among these by reason of high heat transfer efficiency. The above-mentioned heat transfer surface contains not only a surface heated by a heating medium but also a conveyor belt and a tray filled with materials. The above-mentioned heating medium is not particularly limited but conventionally known various media can be used; specific examples thereof include an organic heating medium oil such as DOWTHERM (manufactured by Dow Chemical Company), warm water, water vapor, silicon oil and electric heater. Drying efficiency can further be increased by not only heating from the above-mentioned heat transfer surface but also auxiliary using together one kind or a plurality of infrared rays, microwaves, hot air and the like.

The above-mentioned formulated solution feeder is not particularly limited but conventionally known various types can be used; examples thereof include an oscillating nozzle, header-type nozzle, spray, roller, blade and immersion bath. The above-mentioned dry matter stripping device/apparatus is not particularly limited but conventionally known various types can be used; examples thereof include a scraper such as doctor knife, paddle and spatula. The above-mentioned primary crusher and pulverizer are not particularly limited but the after-mentioned options can be applied.

Conventionally known various dryers can be used as the above-mentioned hot surface adhesion-type dryer; examples thereof include a disk rotary dryer, drum rotary dryer (such as single, double and twin), belt dryer, shelf dryer and multiple cylinder dryer. Among these, a disk rotary dryer, drum rotary dryer, belt dryer and shelf dryer are preferable. Above all, a disk rotary dryer and drum rotary dryer are preferable from the viewpoint of thermal efficiency, rapidity and continuous operability. A disk rotary dryer and drum rotary dryer are devices such that the above-mentioned vinylpyrrolidone polymer-containing solution is applied in a thin film state to a surface of a rotary disk or rotary drum heated from the inside thereof by water vapor and other heating media, and vaporized and dried during one revolution to scrape off the dry matter by a scraping apparatus (a scraper) such as a doctor knife. The feeding (application) and drying of the solution can be repeated while the disk or drum makes one revolution.

On the occasion of drying the above-mentioned vinylpyrrolidone polymer-containing solution by using a hot surface adhesion-type dryer, the temperature of a heat transfer surface of the dryer is not particularly limited, yet preferably the boiling point or higher of solvent of the vinylpyrrolidone polymer-containing solution, more preferably a temperature higher than the boiling point by 10° C. or more. Specifically, the drying is performed in a range of preferably 80° C. to 180° C., more preferably 100° C. to 170° C., further more preferably 120° C. to 160° C. depending on the vinylpyrrolidone polymer-containing solution (such as temperature) and a supply method of the solution.

The drying time on the occasion of drying the above-mentioned vinylpyrrolidone polymer-containing solution by using a hot surface adhesion-type dryer is optionally determined in accordance with the vinylpyrrolidone polymer-containing solution (such as concentration), a supply method of the solution and the dryer; yet, typically the drying is preferably performed in a range of preferably 0.1 minute to 120 minutes.

The coating thickness of the solution on the occasion of drying the above-mentioned vinylpyrrolidone polymer-containing solution by using a hot surface adhesion-type dryer is preferably approximately 0.05 mm to 10 mm, more preferably approximately 0.1 mm to 5 mm depending on the vinylpyrrolidone polymer-containing solution (such as concentration), a supply method of the solution and the dryer. A method of adjusting the coating thickness is not particularly limited and optional methods can be applied, such as to adjust clearance between a heat transfer surface and a calender, blade and roller, to adjust viscosity of the solution, and to adjust supply rate of the solution.

The supply rate of the solution on the occasion of drying the above-mentioned vinylpyrrolidone polymer-containing solution by using a hot surface adhesion-type dryer is not particularly limited, but may be properly determined in consideration of productivity and drying characteristics.

In a process for production of a powder of a vinylpyrrolidone polymer according to the present invention, after the above-mentioned drying, it is important to (a) pulverize so that a content of particles having a particle diameter of 106 μm or smaller is 10% by mass or lower and a content of particles having a particle diameter of greater than 1,000 μm is 5% by mass or lower, or (b) pulverize and subsequently classify so that a content of particles having a particle diameter of 106 μm or smaller is 10% by mass or lower and a content of particles having a particle diameter of greater than 1,000 μm is 5% by mass or lower. Thus, a powder of a vinylpyrrolidone polymer according to the present invention can be obtained, which has excellent solubility and can be made into solution with favorable handleability without dust rising.

Apparatuses capable of being used for pulverizing are not particularly limited and examples thereof include a paddle type, hammer mill, pin mill, ball mill, mortar mill and vibrating mill.

Apparatuses capable of being used for classifying are not particularly limited and examples thereof include an air classifier and screen classifier.

Each process of the above-mentioned drying, pulverizing and classifying may be performed under dehumidified atmosphere depending on properties (such as hygroscopicity) of a product powder.

The present invention can provide a powder of a vinylpyrrolidone polymer which has excellent solubility in spite of having a low K value determined by a Fikentscher's method and which can be made into solution with favorable handleability without dust rising, and can provide a process for production of the same.

EXAMPLES

The present invention is hereinafter described more specifically by examples and is not limited thereto. "Part by mass" and "% by mass" are hereinafter denoted simply as "part" and "%" respectively unless otherwise specified.

Powders of the vinylpyrrolidone polymer obtained by examples and comparative examples were evaluated by the following method.

<Solubility>

Cylindrical stirrer chips (a diameter of 8 mm and a length of 4 cm) and 100 g of ion exchanged water were put in a 100 cc beaker having an inside diameter of 8 cm and stirred at 500 rpm by a magnetic stirrer such that the number of revolutions can be confirmed by a digital display to collectively charge 1 g of the obtained powder into a sloping region of a vortex (a whirl caused by stirring) and measure dissolution time (second) from charge to complete dissolution of the powder. It was visually determined whether the powder was completely dissolved.

<Resistance to Dusting Characteristics>

4 g of the obtained powder was put in a vial made of glass (No. 8, manufactured by MARUEMU CORPORATION) having an inside diameter of 3.5 cm and a height of 12 cm which vial was stoppered and shaken up and down three times to such a degree that the powder struck the stopper, and immediately after the state of clouding in a gaseous phase portion was visually observed in a state of standing to evaluate as "o (acceptance)" the case where clouding was not confirmed in the gaseous phase portion without dust rising and as "×(rejection)" the case where clouding was confirmed in the gaseous phase portion with dust rising.

Production Example

Production of Polyvinylpyrrolidone Aqueous Solution 0.23 parts of copper sulfate and 426.3 parts of water were charged into a reaction vessel and heated up to a temperature of 80° C. Subsequently, 450 parts of N-vinylpyrrolidone, 3.6 parts of 25%-ammonia water and 15 parts of 35%-hydrogen peroxide water were each separately dropped thereinto over 180 minutes while maintaining 80° C. After finishing dropping, 4.5 parts of 35%-hydrogen peroxide water was added thereto under five equal divisions at intervals of one hour, and further retained at 80° C. for one hour after the 5th addition to obtain polyvinylpyrrolidone aqueous solution in which the polyvinylpyrrolidone concentration was 50%. The K value of polyvinylpyrrolidone in the aqueous solution was 30 and remaining N-vinylpyrrolidone amount in the aqueous solution was 10 ppm or less with respect to polyvinylpyrrolidone.

Example 1

The polyvinylpyrrolidone aqueous solution obtained in the above-mentioned Production Example was dried at a disk temperature of 120° C. and a rotational speed of 5 rpm by using a disk rotary dryer ("CD dryer", manufactured by NISHIMURA TEKKOUSYO CO., LTD.; a disk diameter of 50 cm) as a hot surface adhesion-type dryer to obtain a dry matter in thin chip shape. The non-volatile component was 96.2%.

The dry matter was pulverized at a screen aperture of 1.2 mm, a number of revolutions of 4,000 rpm and a supply rate of 121 kg/hour by using a hammer-type pulverizer ("Victorymill VP-1 type", manufactured by HOSOKAWA MICRON CORPORATION), and thereafter classified at the number of classification revolutions of 1,600 rpm, a primary air quantity of 8.7 m³/minute and a secondary air quantity of 6.3 m³/minute by using an air classifier ("Micronseparator MS-1 type", manufactured by HOSOKAWA MICRON CORPORATION) to exclude fine powder and coarse powder.

The obtained powder was subject to sieve classification to measure each of a content of particles having a particle diameter of 106 μm or smaller and a content of particles having a particle diameter of greater than 1,000 μm. The measurement of the content of particles was performed in the following manner.

A sieve (JIS aperture of 106 μm and 1,000 μm) prescribed in Z8801-1 of the Japanese Industrial Standards and a saucer were mounted on a desktop-type screen classifier ("Microtype Electromagnetic Vibration Sieving Machine M-2 type", manufactured by TSUTSUI RIKAGAKU KIKAI CO., LTD.) to charge 5 g of the powder obtained by classifying onto the sieve with an aperture of 1,000 μm, which powder was subject to sieve classification for 10 minutes on a vibration scale of 5.

After a passage of 10 minutes, the mass ($W_1$ g) of the powder remaining on the sieve with an aperture of 1,000 μm, the mass ($W_2$ g) of the powder remaining on the sieve with an aperture of 106 μm and the mass ($W_3$ g) of the powder which passed through the sieve with an aperture of 106 μm and accumulated on the saucer were each measured. A content of particles having a particle diameter of greater than 1,000 μm and a content of particles having a particle diameter of 106 μm or smaller were calculated from the measured masses by using the following expressions (3) and (4).

A content of particles having a particle diameter of greater than 1,000 μm (% by mass)=$W_1/(W_1+W_2+W_3) \times 100$ (3)

A content of particles having a particle diameter of 106 μm or smaller (% by mass)=$W_3/(W_1+W_2+W_3) \times 100$ (4)

Consequently, a content of particles having a particle diameter of 106 μm or smaller was 9% and a content of particles having a particle diameter of greater than 1,000 μm was 0.3% to obtain a polyvinylpyrrolidone powder having an average particle diameter of 270 μm.

When the above-mentioned evaluation was performed by using the obtained polyvinylpyrrolidone powder, dissolution time was 100 seconds and resistance to dusting characteristics was o.

Example 2

The polyvinylpyrrolidone aqueous solution obtained in the above-mentioned Production Example was dried at a drum temperature of 120° C. and a rotational speed of 3 rpm by using a drum rotary dryer ("Drum Dryer", manufactured by KATSURAGI IND. CO., LTD.) as a hot surface adhesion-type dryer to obtain a dry matter in thin chip shape. The non-volatile component was 95.6%.

The dry matter was pulverized for 2 seconds by using a desktop pulverizer ("Wonder Brender", manufactured by OSAKA CHEMICAL CO., LTD.), and thereafter classified for 10 minutes on a vibration scale of 5 by using a desktop-type screen classifier ("Micro-type Electromagnetic Vibration Sieving Machine M-2 type", manufactured by TSUTSUI RIKAGAKU KIKAI CO., LTD.).

A sieve (JIS aperture of 106 μm and 1,000 μm) prescribed in Z8801-1 of the Japanese Industrial Standards and a saucer were mounted on the desktop-type screen classifier to charge and classify 5 g of the powder obtained by pulverizing onto the sieve with an aperture of 1,000 μm.

The powder obtained by classifying was subject to sieve classification on the same conditions as the above-mentioned Example 1 to calculate a content of particles.

Consequently, a content of particles having a particle diameter of 106 μm or smaller was 1% and a content of particles having a particle diameter of greater than 1,000 μm was 0.5% to obtain a polyvinylpyrrolidone powder having an average particle diameter of 450 μm.

When the above-mentioned evaluation was performed by using the obtained polyvinylpyrrolidone powder, dissolution time was 90 seconds and resistance to dusting characteristics was o.

Example 3

The polyvinylpyrrolidone aqueous solution obtained in the above-mentioned Production Example was dried on the same conditions as the above-mentioned Example 2 by using a drum rotary dryer ("Drum Dryer", manufactured by KATSURAGI IND. CO., LTD.) as a hot surface adhesion-type dryer to obtain a dry matter in thin chip shape. The non-volatile component was 96.0%.

The dry matter was pulverized at a screen aperture of 3 mm, a number of revolutions of 2,900 rpm and a supply rate of 108 kg/hour by using a hammer-type pulverizer ("Feathermill FM-1 type", manufactured by HOSOKAWA MICRON CORPORATION).

The powder obtained by pulverizing was subject to sieve classification on the same conditions as the above-mentioned Example 1 to calculate a content of particles.

Consequently, a content of particles having a particle diameter of 106 μm or smaller was 3% and a content of particles having a particle diameter of greater than 1,000 μm was 4.2% to obtain a polyvinylpyrrolidone powder having an average particle diameter of 514 μm.

When the above-mentioned evaluation was performed by using the obtained polyvinylpyrrolidone powder, dissolution time was 200 seconds and resistance to dusting characteristics was o.

Comparative Example 1

The polyvinylpyrrolidone aqueous solution obtained in the above-mentioned Production Example was diluted with water so as to be a concentration of 30% (by reason of being incapable of spraying unless diluted), and the 30% solution was thereafter dried at a hot air inlet temperature of 180° C., a spray pressure of 4.2 MPa and a throughput rate of 48.9 Kg/hour by using a spray dryer ("OD-22G", manufactured by OOGAWARA SEISAKUSHO CO., LTD.) as a spray-type dryer to obtain a powder having a non-volatile component of 95.0%.

This powder was subject to sieve classification on the same conditions as the above-mentioned Example 1 to calculate a content of particles.

Consequently, a content of particles having a particle diameter of 106 μm or smaller was 47.1% and a content of particles having a particle diameter of greater than 1,000 μm was 0% to obtain a comparative polyvinylpyrrolidone powder having an average particle diameter of 104 μm.

When the above-mentioned evaluation was performed by using the obtained comparative polyvinylpyrrolidone powder, dissolution time was 400 seconds and resistance to dusting characteristics was x.

INDUSTRIAL APPLICABILITY

A powder of a vinylpyrrolidone polymer according to the present invention can preferably be applied in the case where a vinylpyrrolidone polymer having a K value of smaller than 50, appropriate for uses such as pressure-sensitive or bonding adhesives for glue stick, cosmetic materials such as humectants and hair conditioners, and tablet binders, is dissolved for use in solvent.

The invention claimed is:

1. A powder of polyvinylpyrrolidone having a K value of smaller than 50 as determined by a Fikentscher's method, comprising a content of vinylpyrrolidone polymer particles having a particle diameter of 106 μm or smaller of 10% by mass or lower and a content of vinylpyrrolidone polymer particles having a particle diameter of greater than 1,000 μm of 5% by mass or lower,
wherein a dissolution time when 1 g of the powder of polyvinylpyrrolidone is dissolved in 100 g of water under stirring at 500 rpm is 250 seconds or less, and
wherein the powder of polyvinylpyrrolidone is produced by:
forming a polyvinylpyrrolidone solution having a K value of smaller than 50 as determined by a Fikentscher's method and a concentration from 30% to 70% by mass,
drying the solution by using a hot surface adhesion-type dryer, and
pulverizing the dried solution so that a content of vinylpyrrolidone polymer particles having a particle diameter of 106 μm or smaller is 10% by mass or lower and a content of vinylpyrrolidone polymer particles having a particle diameter of greater than 1,000 μm is 5% by mass or lower.

2. The powder of polyvinylpyrrolidone according to claim 1, wherein the content of the vinylpyrrolidone polymer particles having a particle diameter of greater than 1,000 μm is 1% by mass or lower.

* * * * *